United States Patent
Wu et al.

(10) Patent No.: US 10,472,500 B2
(45) Date of Patent: Nov. 12, 2019

(54) CHITOSAN BIOPOLYMER AND CHITOSAN BIOPOLYMER BASED TRIBOELECTRIC NANOGENERATORS

(71) Applicant: Purdue Research Foundation, West Lafayette, IN (US)

(72) Inventors: Wenzhuo Wu, West Lafayette, IN (US); Ruoxing Wang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/978,236

(22) Filed: May 14, 2018

(65) Prior Publication Data

US 2018/0346690 A1 Dec. 6, 2018

Related U.S. Application Data

(60) Provisional application No. 62/514,983, filed on Jun. 5, 2017.

(51) Int. Cl.

| H01B 1/00 | (2006.01) |
|---|---|
| C08L 3/00 | (2006.01) |
| C08L 5/08 | (2006.01) |
| C08L 3/02 | (2006.01) |
| C08J 3/28 | (2006.01) |
| H01B 1/12 | (2006.01) |
| H02N 3/00 | (2006.01) |
| B82Y 30/00 | (2011.01) |

(52) U.S. Cl.
CPC . C08L 5/08 (2013.01); C08J 3/28 (2013.01); C08L 3/02 (2013.01); H01B 1/12 (2013.01); B82Y 30/00 (2013.01); C08L 2201/06 (2013.01); C08L 2203/16 (2013.01); C08L 2203/20 (2013.01); H02N 3/00 (2013.01)

(58) Field of Classification Search
CPC ... H01B 1/00; H01B 1/12; H02N 1/04; B29C 43/02; C23C 16/00; C08L 3/02; C08L 5/08; C08J 3/28
See application file for complete search history.

(56) References Cited

U.S. PATENT DOCUMENTS

| 6,030,738 A * | 2/2000 | Michel | G03G 9/08791 |
| | | | 430/108.1 |
| 2017/0359001 A1 | 12/2017 | Wang et al. | |
| 2018/0263539 A1* | 9/2018 | Javey | C12Q 1/005 |
| 2018/0351477 A1* | 12/2018 | Wu | H02N 1/04 |

FOREIGN PATENT DOCUMENTS

| CN | 106957458 A | * | 7/2017 |
| KR | 101829541 B1 | | 2/2018 |

OTHER PUBLICATIONS

Liang et al "Recyclable and green triboelectric nanogenerator", Adv. Mater. 2017, 29, 1604961 (7 pages). (Year: 2017).*
Geng et al "Electrospinning of chitosan dissolved in concentrated acetic acid solution", Biomaterials 26 (2005) 5247-5432. (Year: 2005).*
Bao et al "Lignin biopolymer based triboelectric nanogenerators", APL Materials 5, 074109 (2017). (Year: 2017).*
Rinuado et al "Influence of acetic acid concentration on the solubilization of chitossan", Polymer 40 (1999) 7029-7032. (Year: 1999).*
Nguyen et al "Effect of humidity and pressure on the triboelectric nanogenerator", Nano Energy (2013) 2, 604-608. (Year: 2013).*
Rinaudo et al "Chitin and chitosan: properties and applications", Prog. Polym. Sci. 31 (2006) 603-632. (Year: 2006).*
Yang et al "#D stack integrated triboelectric nanogenerator for harvesting vibrational energy", Adv. Funct. Mater. 2014, 24, 4090-4096. (Year: 2014).*
Sundar et al "Evaluating triboelectric properties of polymer films: an incipient appliance and case studies", Recent Patents of Materials Science 2014, 7, 64-70. (Year: 2014).*
Zhai et al "Study on the antibacterial starch/chitosan blend film formed under the action of irradiation", Carbohydrate Polymers 57 (2004) 83-88.*

* cited by examiner

*Primary Examiner* — Mark Kopec
(74) *Attorney, Agent, or Firm* — Purdue Research Foundation; Zhigang Rao

(57) ABSTRACT

The present disclosure generally relates chitosan-based biopolymers and chitosan biopolymer film based triboelectric nanogenerators generating voltage and current using the triboelectric effect. The chitosan-based biopolymer is a reaction product of at least a chitosan and an acid, and optionally one or more component selected from starch, lignin and/or glycerol.

13 Claims, No Drawings

CHITOSAN BIOPOLYMER AND CHITOSAN BIOPOLYMER BASED TRIBOELECTRIC NANOGENERATORS

CROSS REFERENCE TO RELATED APPLICATIONS

This patent application claims benefit of U.S. Provisional Patent Application Ser. No. 62/514,983 filed Jun. 5, 2017, which is incorporated herein by specific reference.

STATEMENT OF GOVERNMENT INTEREST

This invention was made with government support under Grant No. CMMI-1663214 awarded by the National Science Foundation. The government has certain rights in the invention.

TECHNICAL FIELD

The present disclosure generally relates chitosan biopolymers and chitosan biopolymer based triboelectric nanogenerators generating voltage and current using the triboelectric effect.

BACKGROUND

This section introduces aspects that may help facilitate a better understanding of the disclosure. Accordingly, these statements are to be read in this light and are not to be understood as admissions about what is or is not prior art.

Recently, energy harvesting through sustainable approaches has become of interest not only to address the global energy crises but also to provide power for microscale electronics and sensors in emerging applications such as wearable and implantable devices. An assortment of technologies has been developed to transform environmental energy into electrical power via a variety of mechanisms, including electromagnetic, electrostatic, piezoelectric, and recently, triboelectric processes. Triboelectric nanogenerators (TENG) are highly capable of efficiently harvesting ubiquitous mechanical energy, hinged on principles of contact triboelectrification and electrostatic induction, and have received considerable attention in recent years. See Wang, Zhonglin, Triboelectric nanogenerators as new energy technology and self-powered sensors—Principles, problems and perspectives. *Faraday Discuss*, 2014, 176, 447-458. Ongoing efforts are primarily focused on augmenting power generation by increasing triboelectrification surface area, engineering the physical/chemical properties of contacting surfaces and implementing practical applications. Most of the demonstrated TENGs were built based on synthetic polymers for the ease and cost of manufacturability. However, TENGs utilizing naturally abundant biological materials has received considerably less attention. Obstacles concerning practical, eco-friendly utilization of TENGs such as the intricate fabrication and expensive machinery continue to prevail.

Chitosan is a natural and biodegradable biopolymer generally derived from chitin which is one of the main components of marine crustacean shells. Every year, 6 million to 8 million tons of sea creature shells are produced globally as waste products of food processing Most of them are dumped in landfill or the sea. A sustainable way to utilize this cheap and abundant resource will greatly benefit both economies and the environments. Recently, chitin and chitosan begin to be used for a few areas, such as water treatment, drug delivery, cosmetics, and tissue engineering. However, due to the seasonal and variable supplies of shells resulting in microscopically heterogeneous physical and chemical properties, the large-scale application of chitin or chitosan is not fully developed yet.

Chitosan and its reaction product may offer a valuable opportunity as potential constituents in biomedical devices. The vast disparity in structure and surface properties make it finely tunable for controlled degradation which is desirable in implanted applications.

There remains a need to develop new chitosan biopolymers and explore the new utilities of such chitosan biopolymers.

SUMMARY

A novel lower-cost, biodegradable and flexible triboelectric generators based on chitosan was developed. Tunable electrical outputs were achieved by either mixing the chitosan with other natural materials such as starch and lignin or through laser processing. Laser treatment of biopolymer films with increased surface roughness offers a new way for surface engineering. The chitosan-based TEGs present efficient energy conversion performance and tunable degradation rate. The new class of TEGs derived from natural materials may pave the way towards the economically viable production of flexible TEGs for self-powered nanosystems in biomedical and environmental applications.

In one embodiment, the present disclosure provides a chitosan biopolymer wherein the chitosan biopolymer comprising chitosan and/or chitosan reaction product.

In one embodiment, the present disclosure provides a chitosan biopolymer wherein the chitosan biopolymer comprising chitosan reaction product, wherein the chitosan reaction product is prepared by reacting a mixture comprising chitosan and an acid.

In one embodiment, the present disclosure provides a chitosan biopolymer wherein the chitosan biopolymer comprising chitosan reaction product, wherein the chitosan reaction product is prepared by reacting a mixture comprising chitosan and an acid, wherein the acid is acetic acid.

In one embodiment, the present disclosure provides a chitosan biopolymer wherein the chitosan biopolymer comprising chitosan and/or chitosan reaction product, wherein the chitosan reaction product is prepared by reacting a mixture comprising chitosan and an acid, and one or more substances that is glycerol, starch, lignin, or any combination thereof.

In one embodiment, the present disclosure provides a triboelectric nanogenerator wherein the triboelectric nanogenerator comprises chitosan and/or chitosan reaction product.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure the term "acid" may refer a compound or a substance usually having a sour taste and capable of neutralizing alkalis and reddening blue litmus paper, containing hydrogen that can be replaced by a metal or an electropositive group to form a salt, or containing an atom that can accept a pair of electrons from a base. Acids are proton donors that yield hydronium ions in water solution, or electron-pair acceptors that combine with electron-pair donors or bases. It may be an organic such as acetic acid, or inorganic acid such as hydrochloric acid.

In the present disclosure the term "lignin" and "starch" may refer any naturally obtained or modified substances that a skilled artisan may appreciate and realize the such substances are in the broad categories of such substances. There may be some variations among the substances depending the origination of the substances.

The present disclosure provides a novel chitosan derived composite wherein the chitosan derived composite may be any original natural form or a reaction product with an acid such as acetic acid. The reaction product may be a product of chitosan and an acid, and at least one further component selected from starch, lignin, glycerol, or any combination thereof. The chitosan derived composite may be used to facilely produce a biocompatible film for harvesting mechanical energy via TENG methodology. By adjusting the ratios of the components in the chitosan derived composite, a novel chitosan based biopolymer can be prepared to systematically engineer the physical and chemical properties of the nanocomposites for optimized triboelectric power generation, transforming the otherwise wasted biomaterials into functional devices as flexible TENG. This opens doors to new technologies that utilize waste materials for economically feasible and ecologically friendly systems in self-powered biomedical applications.

In one embodiment, the present disclosure provides a chitosan biopolymer wherein the chitosan biopolymer comprising chitosan and/or chitosan reaction product.

In one embodiment, the present disclosure provides a chitosan biopolymer wherein the chitosan biopolymer comprising chitosan reaction product, wherein the chitosan reaction product is prepared by reacting a mixture comprising chitosan and an acid.

In one embodiment, the present disclosure provides a chitosan biopolymer wherein the chitosan biopolymer comprising chitosan reaction product, wherein the chitosan reaction product is prepared by reacting a mixture comprising chitosan and an acid, wherein the acid is acetic acid.

In one embodiment, the present disclosure provides a chitosan biopolymer wherein the chitosan biopolymer comprising chitosan and/or chitosan reaction product, wherein the chitosan reaction product is prepared by reacting a mixture comprising chitosan and an acid, and one or more substances that is glycerol, starch, lignin, or any combination thereof.

In one embodiment, the present disclosure provides a triboelectric nanogenerator wherein the triboelectric nanogenerator comprises chitosan and/or chitosan reaction product.

In one embodiment, the present disclosure provides a triboelectric nanogenerator wherein the triboelectric nanogenerator comprises chitosan and/or chitosan reaction product, wherein the chitosan reaction product is prepared by reacting a mixture comprising chitosan and an acid.

In one embodiment, the present disclosure provides a triboelectric nanogenerator wherein the triboelectric nanogenerator comprises chitosan and/or chitosan reaction product, wherein the chitosan reaction product is prepared by reacting a mixture comprising chitosan and an acid, wherein the acid is acetic acid.

In one embodiment, the present disclosure provides a triboelectric nanogenerator wherein the triboelectric nanogenerator comprises chitosan and/or chitosan reaction product, wherein the chitosan reaction product is prepared by reacting a mixture comprising chitosan and an acid, and one or more substances that is glycerol, starch, lignin, or any combination thereof.

In one embodiment, the present disclosure provides a triboelectric nanogenerator wherein the triboelectric nanogenerator comprises chitosan and/or chitosan reaction product, wherein the chitosan reaction product is prepared by reacting a mixture comprising chitosan and an acid, and one or more substances that is glycerol, starch, lignin, or any combination thereof, wherein the acid is acetic acid.

In any embodiment of the present disclosure, the chitosan reaction product based composite is a film, wherein the film has a thickness of 0.01-0.75 mm, 0.01-0.5 mm, 0.01-0.3 mm, 0.01-0.2 mm, 0.01-0.1 mm, 0.1-0.75 mm, 0.1-0.5 mm, 0.1-0.3 mm, 0.1-0.2 mm.

In one aspect, the present discloses a triboelectric nanogenerator that comprises a first contact charging member and a second contact charging member. The first and second contact charging members each comprises a first contact layer and a second conductive electrode layer. The first contact layer has a contact side and an opposite backside. The first contact layers of the first contact charging member and the second contact charging member each comprises a different material that has a triboelectric series rating indicating a propensity to exchange electrons between the two first contact layers due to a contacting event. The second conductive electrode layer is disposed along the backside of the first contact layer. The second contact charging member is spaced apart from and disposed oppositely from the first contact charging member. The second conductive electrode layer is configured to act as an electrode. A mechanism is configured to maintain a space between the first contact charging member and the second contact charging member except when a force is applied thereto. One of the two said first contact layers comprises a chitosan-based biopolymer of the present disclosure wherein the biopolymer is any natural chitosan or a reaction product of chitosan of an acid, and optionally one or more component comprising starch, lignin, glycerol or any combination thereof. The other said first contact layer comprises a different polymeric material other than the lignin-based biopolymer of the present invention. The different polymeric material may be but is not limited to a polyimide polymer. In one aspect, the polyimide polymer has a repeating unit of formula I, n is 1-10000. A commercial available polyimide polymer is Kapton developed by Dupont™.

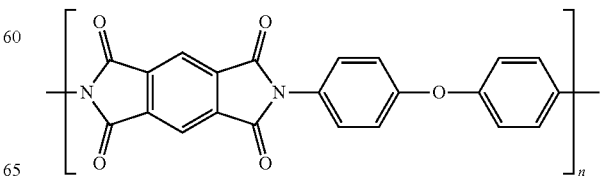

(I)

In one embodiment, the present disclosure provides a method of preparing a chitosan-based composite wherein the method comprises reaction a chitosan with an acid, and with an optional starch, glycerol, or any combination thereof to form a chitosan based gel, and prepare a film from the chitosan based gel.

In one embodiment, the present disclosure provides a method of preparing a chitosan-based composite wherein the method comprises reacting a chitosan with an acid, optionally with a starch, glycerol, or any combination thereof to form a chitosan based gel; prepare a chitosan based film with the chitosan based gel; and treat the surface of the chitosan based film with a laser beam.

In one embodiment, the present disclosure provides a chitosan based triboelectric nanogenerator wherein the triboelectric nanogenerator has an output power density of 125-250 nW/cm$^2$, 125-200 nW/cm$^2$, 125-175 nW/cm$^2$, 150-250 nW/cm$^2$, 150-250 nW/cm$^2$, 150-200 nW/cm$^2$ 150-175 nW/cm$^2$.

In one embodiment, the present disclosure provides a chitosan based triboelectric nanogenerator wherein the triboelectric nanogenerator can provide a voltage from 0.1-5.0 V, 0.1-4.0 V, 0.1-3.0 V, 0.1-2.0 V, 0.3-5.0 V, 0.3-4.0 V, 0.3-3.0 V, 0.3-2.0 V, 0.5-5.0 V, 0.5-4.0 V, 0.5-3.0 V, 0.5-2.0 V, 1.0-5.0 V, 1.0-4.0 V, 1.0-3.0 V, 1.0-2.0 V. 1.5-5.0 V, 1.5-4.0 V, 1.5-3.0 V, 1.5-2.0 V.

In one embodiment, the present disclosure provides a chitosan-based triboelectric nanogenerator wherein the triboelectric nanogenerator can control the value of an output and the direction (positive or negative) of an output by adjusting the composition and concentration of the components in the chitosan based film.

In any embodiment of the present disclosure, the weight percentage of chitosan is 2-98%, 5-95%, 10-90%, 10-80%, 10-70%, 10-60%, 10-50%, 10-40%, 10-30%, 10-20%, 20-90%, 20-80%, 20-70%, 20-60%, 20-50%, 20-40%, 20-30%, 30-90%, 30-80%, 30-70%, 30-60%, 30-50%, or 30-40%.

In any embodiment of the present disclosure, the weight percentage of starch is 2-98%, 5-95%, 10-90%, 10-80%, 10-70%, 10-60%, 10-50%, 10-40%, 10-30%, 10-20%, 20-90%, 20-80%, 20-70%, 20-60%, 20-50%, 20-40%, 20-30%, 30-90%, 30-80%, 30-70%, 30-60%, 30-50%, or 30-40%.

In any embodiment of the present disclosure, the weight percentage of glycerol is 0.1-30%, 0.5-30%, 1-30%, 2-30%, 3-30%, 4-30%, 5-30%, 10-30%, 0.5-20%, 0.5-10%, 0.5-5%, 0.5-3%, 1-20%, 1-10%, 1-5%, or 1-3%.

In any embodiment of the present disclosure, the weight percentage of an acid is 0.1-30%, 0.5-30%, 1-30%, 2-30%, 3-30%, 4-30%, 5-30%, 10-30%, 0.5-20%, 0.5-10%, 0.5-5%, 0.5-3%, 1-20%, 1-10%, 1-5%, or 1-3%.

In any embodiment of the present disclosure, the thickness of a chitosan-based film is 5-500 μm, 5-400 μm, 5-300 μm, 5-200 μm, 5-100 μm, 25-500 μm, 25-400 μm, 25-300 μm, 25-200 μm, 25-100 μm, 25-500 μm, 25-400 μm, 25-300 μm, 25-200 μm, 25-100 μm, 50-500 μm, 50-400 μm, 50-300 μm, 50-200 μm, or 50-100 μm.

In any embodiment of the present disclosure, any chitosan-based film is substantially free of air/gas and solvent to provide acceptable output power density for TENG.

The structure of a chitosan-based TENG may comprise a chitosan-based film and a Kapton film, both of which are backed by copper electrodes. Chitosan-based films were developed using natural waste materials and are biodegradable, eco-friendly, and low cost. According to the triboelectric series, Kapton has a stronger ability to acquire electrons while wood, of which lignin is a part, has a stronger tendency to lose electrons. When the chitosan-based film is brought into contact with the Kapton film, the difference from these triboelectric polarities leads to electrons flowing between the two films. The direction of electron flow is dictated by the relative difference in the surface properties, e.g. the surface work function, between the two films. Such surface properties of interest for the triboelectrification process are strongly dependent on the composition and preparation of the nanocomposites. In a typical case where the as-prepared chitosan composite induces positive triboelectric charges upon the contact with the Kapton film. Separation of the two films results in a potential difference between the two electrodes and causes electrons to flow in the opposite direction. These mechanically-induced contact and separation events, therefore, give rise to the output electrical power through the back-and-forth flow of electrons in the external circuit. A linear motor is applied to apply the controlled mechanical stimuli.

Experiments

Fabrication of Chitosan-Based Films

Typically, 0.5333 g chitosan powders (Spectrum Chemical, $(C_6H_{11}NO_4)_n$) were fully dissolved in 20 mL 2% (v/v) acetic acid (HAc) solution under stirring to form a homogeneous gel. Then, the mixture was put in a vacuum chamber for degassing. After about 10 min, bubbles stopped generating. The gel was carefully transferred into a plastic mold casting for 24 h at room temperature. When solvent was totally evaporated, the pure chitosan film can be peeled up with thickness of 100 μm.

The blended chitosan films with other natural materials were produced under similar procedure with some changes described as follows. To prepare samples containing extra acetic acid, 10% (v/v) HAc solution was applied to replace the 2% solvent. When fabricating the chitosan-lignin film, 0.5333 g Kraft lignin powders (Sigma-Aldrich) was added with chitosan together (1:1) into 20 mL 2% acetic acid solution mixing sufficiently. As for chitosan-glycerol film, 4 mL glycerol (20%, v/v) was blended with 16 mL 2% acetic acid as solvent. Starch from potato (*Alfa Aesar*) should be gelatinized in water first. In detail, 1.066 g starch was put in 10 mL deionized water stirring at 120° C. for 30 min. It became translucent viscous gel. Then, 10 mL chitosan gel (0.5333 g chitosan in 10 mL 2% HAc solution) was mixed with 10 mL starch gel, repeating the degassing and casting steps to obtain the final products.

Laser-Processing Method

The chitosan based film sample was cut into 1 cm by 2 cm rectangular and was laid on a glass slide. The glass slide together with the chitosan sample was mounted on a motorized linear motion stage (Parker Motion, MX80L). A Q-switched Nd:YAG laser (Spectra-Physics, Quanta-Ray Indi) with wavelength of 532 nm was used. The pulse energy and the pulse repetition rate were ~13 mJ and 5 Hz respectively. The laser beam parallel with the workpiece surface was focused using a 150-mm plano-convex lens with the focused beam spot ~1 mm above the workpiece surface. The focused laser beam generated air-breakdown plasma around the focal point, which induced etching of the chitosan workpiece. The chitosan workpiece was scanned relative to the plasma using the motorized linear stage at a speed of 0.66 mm/s. Total number of pulses varies from 2100 to 8400.

Results

All functional films are made from abundant natural materials by very facile method as described in experimental sections. Large amount of samples can be produced with defined shape and area by using different molds. The main material, chitosan, is one of the most ubiquitous biopolymer in the world derived from the shells of shrimp or other crustaceans. Chitosan is insoluble in water but it can be dissolved in weak acid solution benefit from the protonation of amino groups ($NH_2$). There are intramolecular and intermolecular hydrogen bonds formed among —OH, —$NH_3$ groups and water molecules in the solution, resulting in network structure which enables the film formation. Besides, stirring process also causes bundles among these polysaccharide chains, resulting in higher strength but lower ductility of the film. In addition, the film formation, in other words, the chain conformation, is strongly affected by the type and concentration of acid. Hydrochloric acid with the same concentration is applied instead of acetic acid as an example. The lower pH value increases the degree of hydrolysis of chitosan, producing low weight chitosan molecules with shorter chains. Hence, the product casted from the HCl solution is more likely to aggregated clusters rather than uniform film. Except the aspect of film formation, the protonated groups (—$NH_3^+$) makes the chitosan films carry positive charges which are potentially be utilized for electricity harvesting.

Considering the above factors, starch, lignin, glycerol and extra acetic acid are selected to be mixed with chitosan-acetic acid solution for modifying the film properties. All of them are, like chitosan, environmental-friendly abundant natural materials. Starch that we used is made from potato; lignin is the component of supporting tissue in plants, especially wood; glycerol is generally obtained from plant and animal fat; acetic acid can be generated by bacterial fermentation. The photos and SEM images of chitosan-based films mixed with various materials demonstrated that all films show glossy surface in optical images. They are transparent except the film with lignin. Since lignin, unlike the other additives, is brown and insoluble in water, it lies in both inside and surface of film. The corresponding SEM image shows dense particles on the exterior of the film, contrasting greatly from the other images on the micro scale which display smoother films. The film with starch may also have rough surface due to undissolved powders depending on the degree of gelation. As for pure chitosan film, chitosan film with extra acetic acid and chitosan film with glycerol, they all form homogeneous gel and flat surface after casting.

FT-IR spectroscopy is used to analyze the structure and interactions between components. The broad band at 3250 $cm^{-1}$ is the hydroxyl stretching, exactly in the range of typical high concentration alcohol with large amount of hydrogen bonds. It is also overlapped by N—H stretching in the same region. The band at 1540 $cm^{-1}$ is the N—H bending of amide II while the band of amide I appears at 1635 $cm^{-1}$ representing the C=O stretching. The peaks at around 1000 $cm^{-1}$ denote the C—H vibrations.

Although all of starch, lignin and glycerol contain large amount of hydroxyl groups, the positions of hydroxyl band peaks in spectrum of chitosan with starch, lignin and glycerol are right shifted with lower intensity compared to that of pure chitosan spectra, indicating the decreased number of —OH because of hydrogen bonds formation. The same trend also occurs on the peaks of N—H bending, suggesting the interaction between amino groups and hydroxyl groups. In addition, the peaks observed at 1151 $cm^{-1}$ representing the antisymmetric stretching of C—O—C bridge support the cross-linking structure inside the films, although the degree of cross-linking is relatively low without extra cross-linking agent.

The degree of cross-linking of these blend films are various due to the properties of components influencing the mechanical performances which can be seen in the tensile strength-strain curves. Pure chitosan film shows high strength but low ductility and toughness because of both the hydrogen bonds and bundles among chains. In contrast, glycerol, as a small molecule, cannot induce network structure. Hence, the chitosan glycerol mixed solution casts into film instead of remaining liquid state benefit from the exist of hydrogen bonds. And the film has viscoelasticity property that can be used as a stretchable environmental-friendly material. Chitosan-glycerol films are adhesive on human skin and became wrinkled along with skin at compressed state, suggesting good stretchability within soft bio-systems.

Owing to the surface charges determined by the components, chitosan-based blend films were applied as functional layers for triboelectric generators. The working mechanism is based on the contact separation mode. Pure chitosan film carrying positive charges, while Kapton is a relatively negative electrode, when they are contacted by external force, the electrons will transfer from the negative side to positive one. Meanwhile, reverse charges were induced inside the metal electrode and electrons transfer to recover the induced charges to remain electric neutrality. So they formed an electrical potential on the external circuit, which can be used for driving other devices. By mixing with other natural materials at different positions in triboelectric series, the relative ability to attract electrons compared with Kapton was tuned, resulting in tunable electrical outputs.

Chitosan films fabricated with about 10% acetic acid solution show significantly great performances on both voltage and current. Excepting the protonated amino groups, acetic acid itself is also a positive charged substance in the triboelectric series, which means extra acetic acid can absorb electrons enhancing the signal of generator. As for lignin purified from wood, which locates at similar position as pure chitosan in the triboelectric series, did not change the output performances obviously. On the contrary, starch, consisting a large number of oxygen atoms which is high electronegativity, will absorb electrons neutralizing the positive charges from chitosan, resulting in lower output performances even opposite signals with higher ratio of starch. This interesting property can be utilized for adjusting the whole surface charge type to adapt with various counter electrodes. Moreover, glycerol has the same effect as starch benefit from the hydroxyl groups which are good electron donors and can increase the amount of transferred electrons during the contact electrification, giving rise to triboelectric layers with a higher charge density. In addition, the presence of glycerol increases the absorption of water from air on the film surface, forming active water bridge and enabling to produce mobile ions for charges transfer. The output powers of the chitosan-based films were all measured with different external load resistors. The optimized results show at about 100 $M\Omega$, and the biggest power, about 9 nW, was generated from chitosan film with 10% acetic acid, which agree well with the order of voltage and current values. Therefore, the electrical performances can be modified through adjusting the components of the blend films.

To further investigate the potential of chitosan-based TEGs for implantable applications, their biodegraded rates under water droplets were observed. When water dropped, the chitosan film fabricated with about 10% acetic acid solution generated largest peak current at the beginning compared with other samples. But cracks appeared on this film very quickly because of the relatively high concentration of acid promote the dissolution of chitosan into water. Then, the film was falling way from the electrode after 1 min, and the direct contact between water droplets and electrode caused short circuiting. Pure chitosan film also generated large peak current at the first half minute. The signals turned to relatively small but stable when the film was saturated by water. The steady outputs sustained for about 3 mins and came off from the electrode. As for the chitosan film with glycerol, it shown consistent signals for at least 10 mins. And the peak current was opposite with the current generated from pure chitosan and chitosan with 10% acetic acid films, which agrees with the electrical tests. There was no obvious visual change of chitosan-glycerol film under the water droplets while the imbibition of pure chitosan film was apparent. Moreover, the chitosan-glycerol film can be totally dissolved after 48 h immersed water. These stationary performances indicate that chitosan-glycerol films are suitable as a sustained environment-friendly power source in bio-systems, especially considering its stretchable property.

In summary, chitosan-based natural films were applied to work as environmental friendly power sources for electricity harvesting. The performances can be adjusted by changing the components of the films and laser treatment. The interactions inside the films between mixed, materials were analyzed to explain the influence of surface charge density. And the laser processing applied to polymer provides a new way for surface modification. The new class of TEGs derived from natural materials may pave the way towards the economically viable production of flexible TEGs for self-powered microsystems in biomedical and environmental applications.

Those skilled in the art will recognize that numerous modifications can be made to the specific implementations described above. The implementations should not be limited to the particular limitations described. Other implementations may be possible.

The invention claimed is:

1. A triboelectric nanogenerator comprising a chitosan-based biopolymer, wherein the chitosan-based biopolymer comprises a reaction product of a mixture comprising at least a chitosan and an acid, and at least one additional component comprising glycerol, starch, lignin or any combination thereof, wherein the chitosan-based biopolymer is presented as a film, wherein the film has a 30-90 wt % of chitosan, and wherein the triboelectric nanogenerator has a tunable output power density of 150-250 nW/cm$^2$.

2. The triboelectric nanogenerator of claim 1, wherein the acid is acetic acid.

3. The triboelectric nanogenerator of claim 2, wherein the chitosan-based biopolymer comprises a reaction product of a mixture comprising chitosan, acetic acid, and glycerol, wherein the chitosan-based biopolymer presents as a film, and the film is soluble in water to function as a suitable biodegradable film.

4. The triboelectric nanogenerator of claim 2, wherein the chitosan-based biopolymer comprises a reaction product of a mixture comprising chitosan, acetic acid, and starch.

5. The triboelectric nanogenerator of claim 2, wherein the acetic acid has a concentration of at least 10% (v/v).

6. The triboelectric nanogenerator of claim 1, wherein the film is substantially free of gas/air and solvent.

7. The triboelectric nanogenerator of claim 1, wherein the film is further treated with a laser beam.

8. A chitosan based biopolymer, wherein the biopolymer is a reaction product of a mixture comprising at least a chitosan and an acid, and at least one or more component selected from the group consisting of starch, glycerol, lignin, and any combination thereof, wherein the chitosan based biopolymer is presented as a film, wherein the film has a 30-90 wt % of chitosan, wherein the chitosan based film is capable of generating a tunable output power density of 150-250 nW/cm$^2$ in a triboelectric nanogenerator.

9. The chitosan-based biopolymer of claim 8, wherein the acid is acetic acid.

10. The chitosan based biopolymer of claim 8, wherein the chitosan-based biopolymer can generate a output voltage of 0.1-5 V.

11. The method of claim 8, wherein the film is further treated with a laser beam.

12. A method of preparing a chitosan based biopolymer, wherein the method comprises reacting a chitosan with an acid, and at least with a starch, glycerol, or any combination thereof to form a chitosan based gel; preparing a chitosan based film with the chitosan based gel; and treating the surface of the chitosan based film with a laser beam, wherein the chitosan based film is capable of generating a tunable output power density of 150-250 nW/cm$^2$ in a triboelectric nanogenerator.

13. The method of claim 12, wherein the acid is acetic acid.

* * * * *